(No Model.)
A. HALLWIG.
ASH SIFTER.
No. 319,407. Patented June 2, 1885.
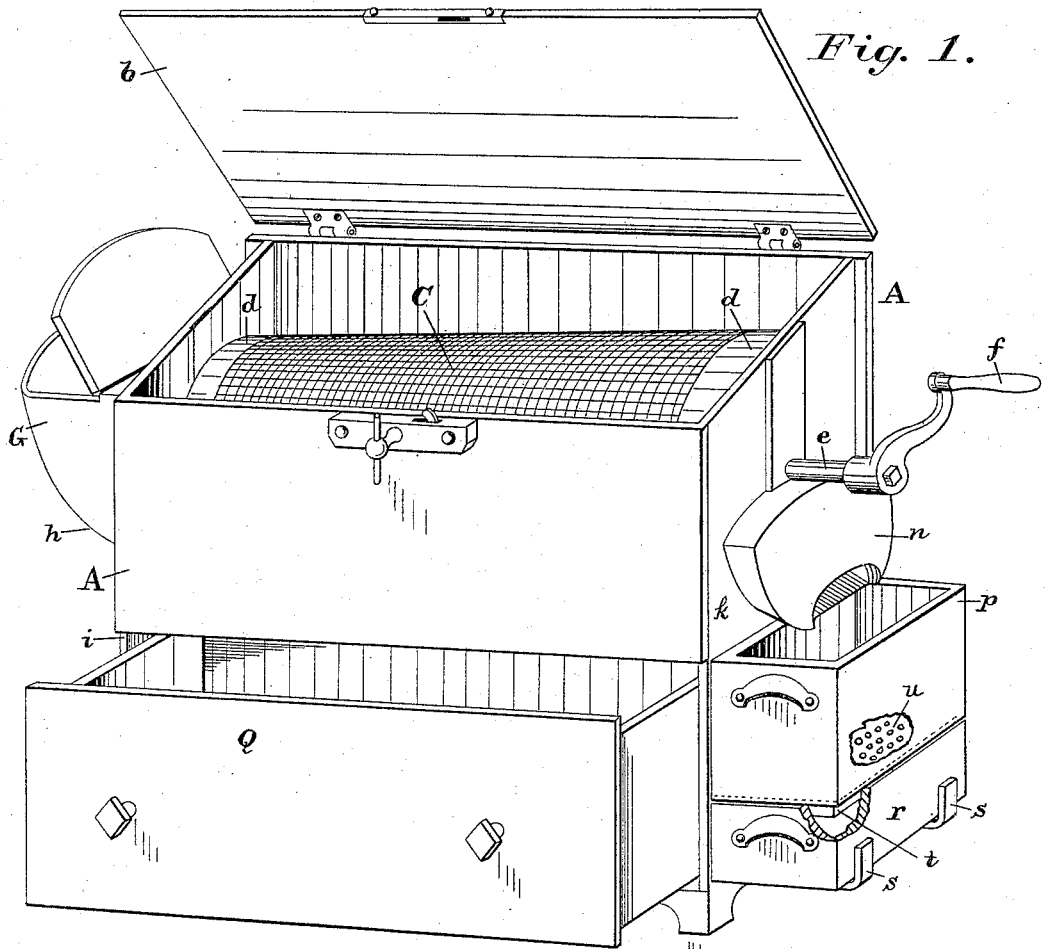
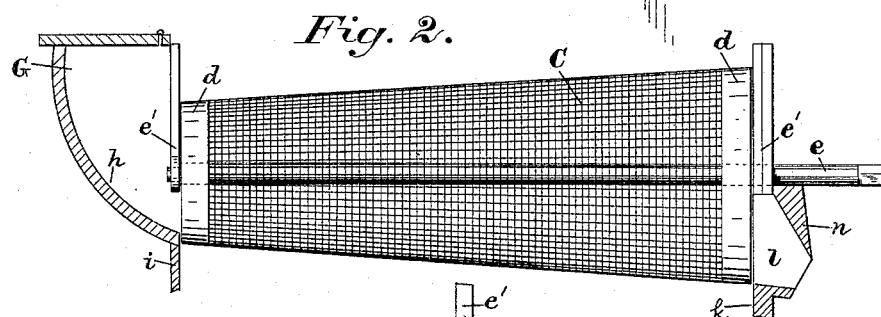
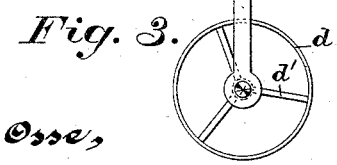
WITNESSES:
Edward A. Osse,
John E. Morris.
INVENTOR:
Arthur Hallwig
By Chas. B. Mann
Attorney.

UNITED STATES PATENT OFFICE.

ARTHUR HALLWIG, OF BALTIMORE, MARYLAND.

ASH-SIFTER.

SPECIFICATION forming part of Letters Patent No. 319,407, dated June 2, 1885.

Application filed March 2, 1885. (No model.)

*To all whom it may concern:*

Be it known that I, ARTHUR HALLWIG, a citizen of the United States, residing at Baltimore, in the State of Maryland, have invented certain new and useful Improvements in Ash-Sifters, of which the following is a specification.

My invention relates to improvements in ash-sifters, and will first be described, and then designated in the claim.

In the accompanying drawings, which illustrate the invention, Figure 1 is a perspective view of the machine. Fig. 2 is a side view of the tapered cylindric sieve and a sectional view of the ash-receiver and coal-discharger. Fig. 3 is a view of the small open end of the sieve.

The letter A designates the case which incloses the sieve; b, the cover or top, which is here shown hinged; but this is unimportant, since the top is raised or removed only when it may be necessary to repair the sieve.

The sieve C is made of woven wire, or may be made of perforated sheet metal, is in the form of a tapered cylinder, and has at each end an open hoop, d, with arms d', which are attached to a shaft, e, extending through the sieve. The shaft e has a horizontal position, and is suspended in suitable bearings, e', and thereby the sieve is adapted to revolve. A crank, f, fixed at one end of the shaft, serves to turn the sieve. The sieve has position within the walls of the case, and attached to the outside of the case, at one end, is an ash-receiver, G, whose bottom h slopes, and directs ashes which are placed therein into the small end of the tapered cylindric sieve. An opening through the end wall, i, of the case allows the ashes to pass from the receiver into the sieve. At the other end, k, of the case, and coincident with the lower part of the large end of the cylindric sieve, is a discharge-opening, l, in the end wall of the case, and a shield or cover, n, on the outside of the case hides the discharge-opening and directs the screened coals into the coal-box p.

An ash-drawer, Q, fits in the side of the case and has position below the sieve.

A water-tight box, r, is supported on bars or brackets s, projecting from the end of the case, and the coal-box p has on its bottom a downward flange, t, which fits within the top of the water-tight box, while the coal-box itself sits upon the water-tight box. The coal-box p has a perforated bottom, u.

When the screened coals pass from the sieve into the coal-box, they are covered with more or less ash-dust, and by means of the perforated bottom u and the water-tight box below these screened coals may be washed. Water is poured upon the coals in the box p, and thereby the ash-dust is washed off, and passes, with the water, into the water-tight box.

From the foregoing description the operation will be readily understood. The ashes and coals are placed into the receiver G. By turning the crank the sieve is revolved, and, from the fact that the lower side of the sieve is on an incline from the small end to the large, the coals are induced to pass through the sieve and discharge into the coal-box, while the ashes sift through into the ash-drawer.

Having described my invention, I claim and desire to secure by Letters Patent of the United States—

An ash-sifter comprising a case provided with an ash-receiver and a coal-discharger, a cylindric sieve open at both ends, a water-tight box supported below said coal-discharger, and a coal-box having a perforated bottom, and resting on the water-tight box, as set forth.

ARTHUR HALLWIG.

Witnesses:
 GEORG KRAFT,
 FRED. BINDER.